Oct. 18, 1938.   J. P. HUBBELL   2,133,817
LIQUID DISPENSING APPARATUS
Filed Aug. 14, 1935   3 Sheets-Sheet 1

INVENTOR
JESSE P. HUBBELL
BY John E. Hubbell
ATTORNEY

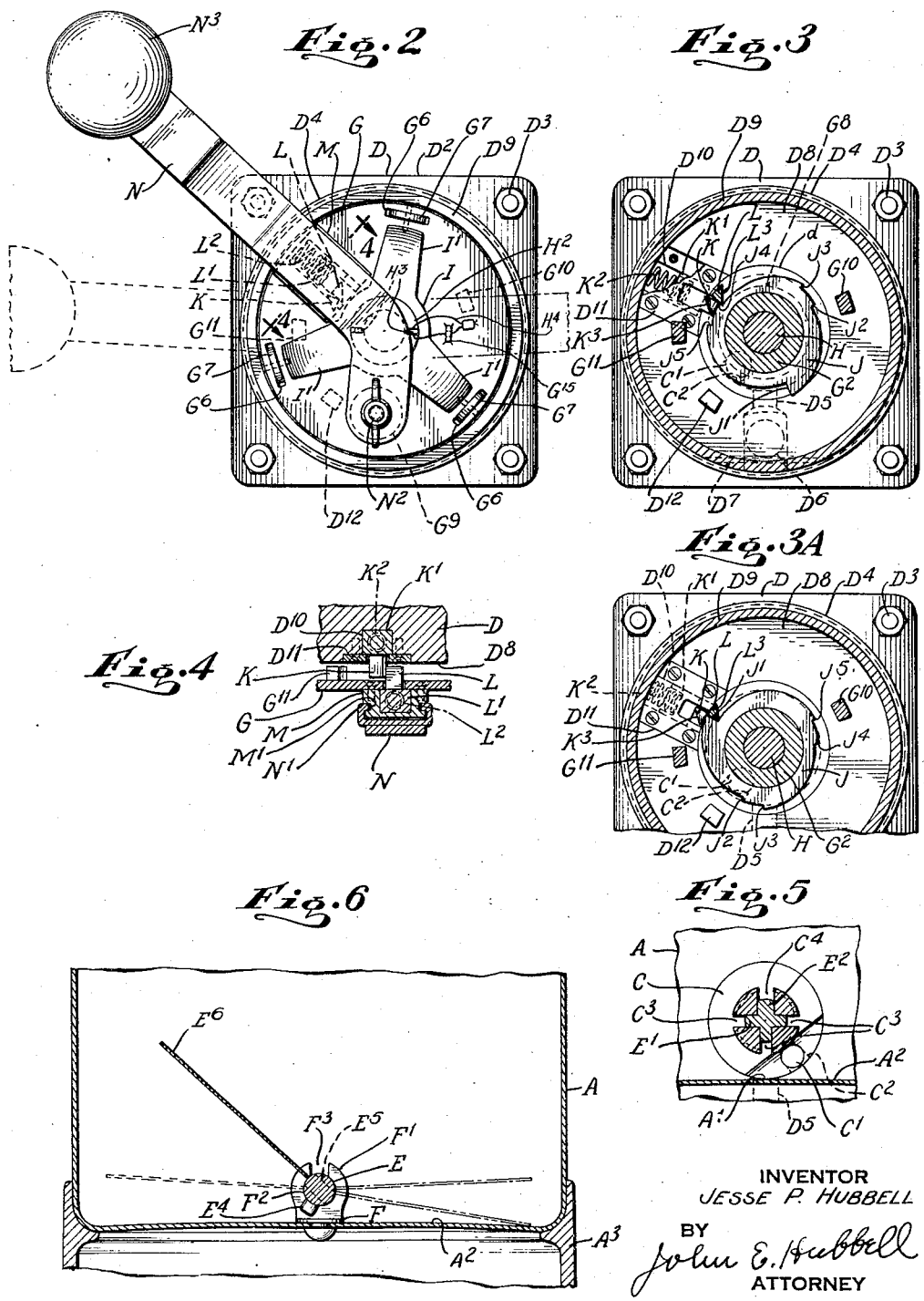

Oct. 18, 1938.  J. P. HUBBELL  2,133,817
LIQUID DISPENSING APPARATUS
Filed Aug. 14, 1935  3 Sheets-Sheet 3
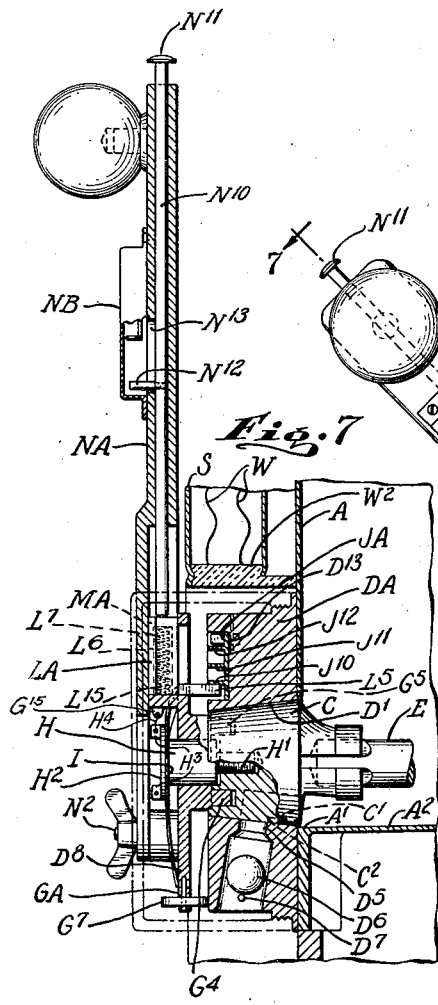
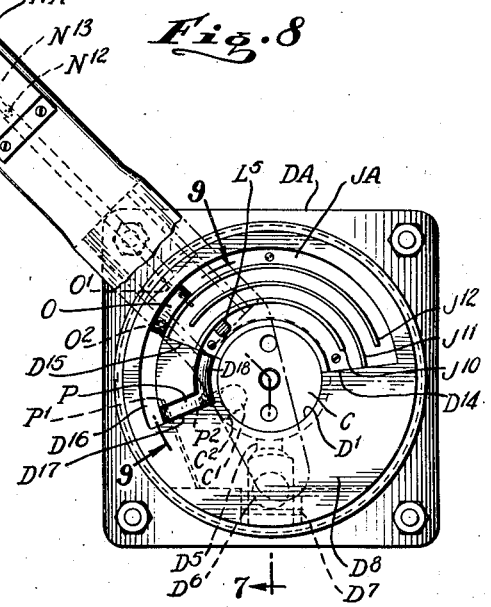
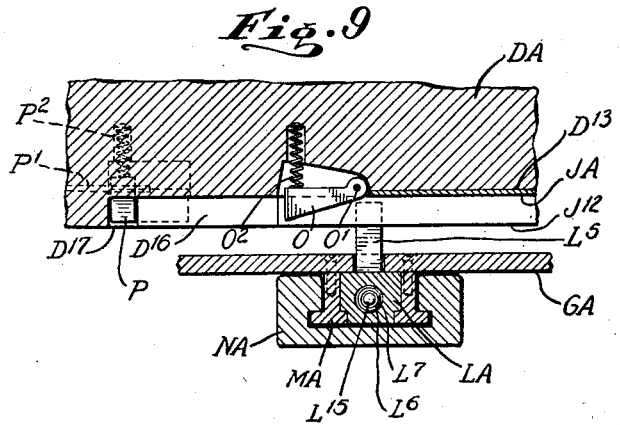
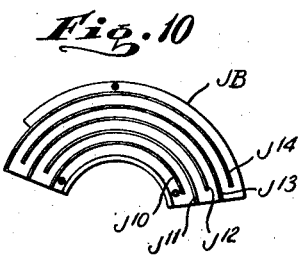
INVENTOR
JESSE P. HUBBELL
BY John E. Hubbell
ATTORNEY Patented Oct. 18, 1938

2,133,817

UNITED STATES PATENT OFFICE 2,133,817

LIQUID DISPENSING APPARATUS

Jesse P. Hubbell, Fanwood, N. J.

Application August 14, 1935, Serial No. 36,143

16 Claims. (Cl. 221—67)

The general object of the present invention is to provide improvements in liquid dispensing apparatus of the type disclosed in my Patent No. 2,013,464 granted Sept. 3, 1935, and embodying the general principles of the invention disclosed in said prior patent.

The apparatus of my said patent comprises a container which, when used for milk storing and dispensing purposes, may be of the general dimensions of a milk can used for the storage and shipment of milk, and which is provided with an outlet at its bottom, a valve controlling said outlet, means connected to the valve for agitating the contents of the container, and a valve operating mechanism including means compelling a plurality of to and fro movements of the valve member, and corresponding movements of the agitating means, in moving the valve to its discharge position following each closure of the valve.

The inventions disclosed and claimed in my said patent and herein, are not restricted to use in dispensing milk, but are adapted for use in dispensing any other liquid, such as orange and other fruit juices, which contains constituents tending to segregate, so that unless the contents of the apparatus container are agitated prior to the withdrawal of a portion, the portion withdrawn will not contain suitable percentages of the different constituents of the receptacle contents.

Specific objects of the invention are to simplify and perfect the valve operating mechanism of the dispensing apparatus, and the means by which the valve and agitating means are removably mounted in the container, and to provide for the ready adjustment of the valve operating mechanism to vary the number of oscillatory movements given the valve and agitator in opening the valve following each closure of the latter.

The various features of novelty which characterize my invention are pointed out with particularity in the claims annexed to and forming a part of this specification. For a better understanding of the invention, however, its advantages, and specific objects attained with its use, reference should be had to the accompanying drawings and descriptive matter in which I have illustrated and described preferred forms of embodiment of the present invention.

Of the drawings:

Fig. 2 is an elevation taken at right angles to, and showing a portion of the apparatus shown in Fig. 1;

Fig. 3 is a partial section on the line 3—3 of Fig. 1;

Fig. 3A is a fragmentary view taken similarly to Fig. 3, but showing parts in different relative positions;

Fig. 4 is a partial section on the line 4—4 of Fig. 2;

Fig. 5 is a section on the line 5—5 of Fig. 1;

Fig. 6 is a section on the line 6—6 of Fig. 1;

Fig. 7 is a section on the line 7—7 of Fig. 8, illustrating a modified form of valve operating mechanism;

Fig. 8 is an elevation taken at right angles to Fig. 7, with parts removed;

Fig. 9 is a partial developed section on the line 9—9 of Fig. 8; and

Fig. 10 is an elevation of a labyrinth control part interchangeably usable with a part shown in Figs. 7–9.

Figure 1:
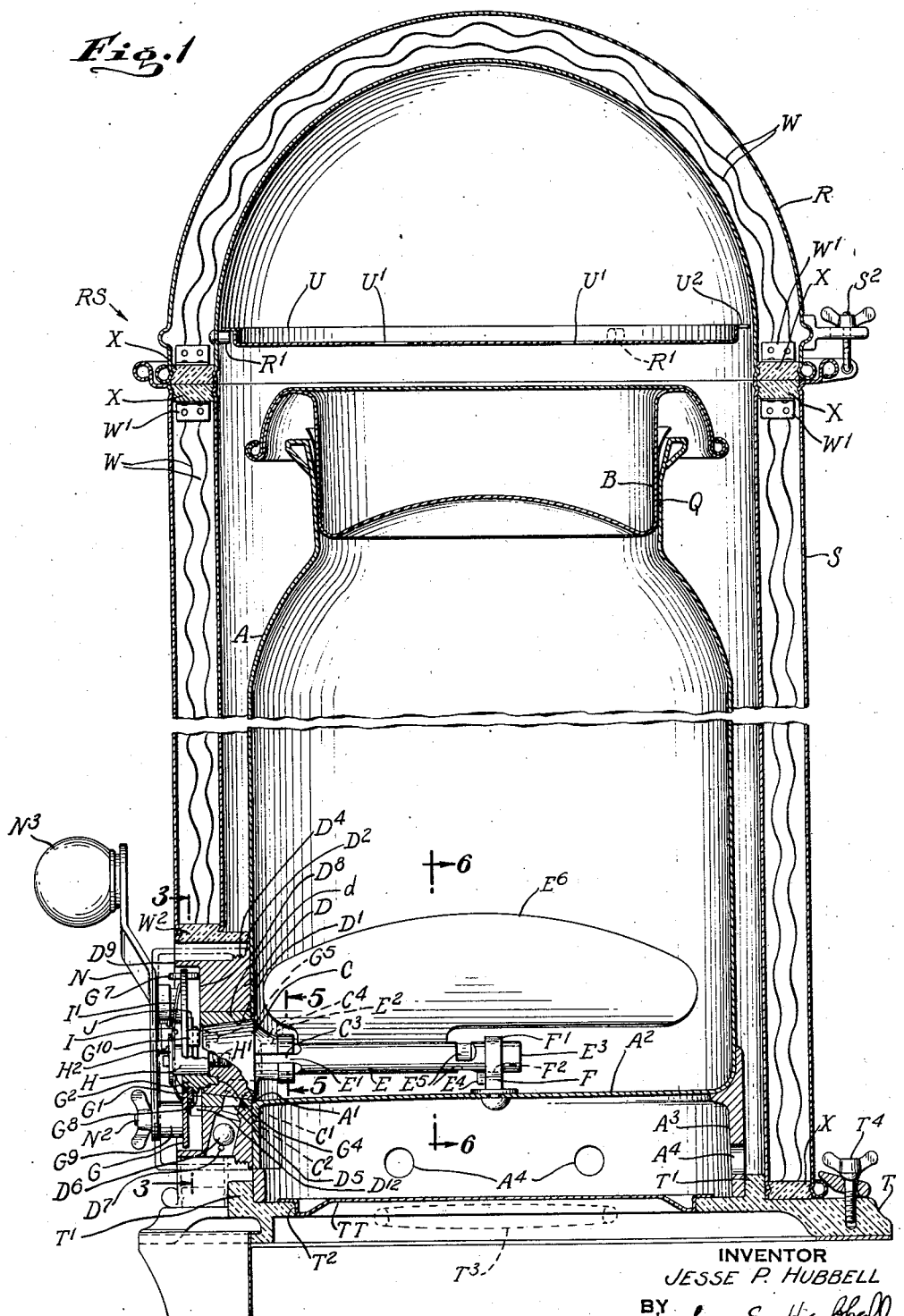
Fig. 1 is an elevation with parts broken away and in section, of apparatus embodying one form of the present invention.

In the form of the invention shown in Figs. 1–6, A is a container having a top B providing a plug closure for a filling opening at the top of the container, and having a discharge valve C adjacent the bottom of the container. Except for the valve C and parts associated therewith and an air inlet hereinafter described, the container A may be of the general type, form, and capacity of five or ten gallons or so, now customarily employed in transporting and dispensing milk, though the container is adapted for use with little or no change in form for dispensing other liquids, such as orange juice and other beverages.

As shown, the valve C is a tapered plug cock mounted in a valve casing member D, which is secured in any suitable manner to the container A, and is formed with an open ended valve passage or chamber D', tapered to receive a cock C and communicating at its inner and larger end with the tank interior through an opening A' in the side wall of the tank. As shown, the member D comprises a base portion $D^2$ of rectangular outline and curved to fit against the cylindrical outer surface of the tank A, to which the base portion is secured by bolts or rivets $D^3$, and advantageously by welding or brazing, also. The portion of the member D at the outer side of its base portion $D^2$, is advantageously cylindrical, and comprises a cylindrical collar portion $D^4$, adjacent the base portion $D^2$. The collar portion $D^4$ is externally threaded for the detachable connection to the member D of a cap member, shown in dotted lines in Fig. 1, and in Fig. 8, which may be employed in the transportation and storage condition of the apparatus, enclosing all of the casing member D and parts mounted therein and thereon, with the exception of the base portion $D^2$ and the removable operating handle N. The use and advantages of such a cap member are described in my said prior patent. As shown, the valve chamber $D'$ is lined by a bushing or valve seat member $d$ of suitable metal, which may be secured, as by means of a driving fit, in a passage formed for the purpose in the body portion of the member D.

The valve member C is formed with an outlet portion comprising a hole $C'$ drilled into the valve member from the inner end of the latter, and an intersecting hole $C^2$ drilled in the valve member from the periphery of the latter. In the discharge position of the valve, the outer end of the hole $C^2$ registers with a discharge passage $D^5$ formed in the body portion of the casing member D and lining member $d$, at the under side of the chamber $D'$. The lower portion of the passage $D^5$ is shown as enlarged to receive a non-return valve $D^6$, shown as a ball valve normally held against removal from the enlarged end of the passage $D^5$ by a removable pin $D^7$. The valve $D^6$ serves to prevent unauthorized refilling of the container through the discharge outlet.

At its inner end, the valve member C is detachably coupled to the adjacent end of a coaxial agitator shaft E, which has its opposite end journalled in a bearing part F rigidly attached to and extending upward from the central portion of the bottom wall $A^2$ of the container. The coupling provisions shown comprise radial slots $C^3$ and $C^4$ formed in an axial projection from the inner end of the valve C and intersecting one another adjacent the valve axis. The slots $C^3$ and $C^4$ may be all alike except that preferably, and as shown, the slot $C^4$ is wider than the slots $C^3$. The adjacent end of the shaft E is cut away to provide radial ribs $E'$ and $E^2$ integrally connected adjacent the axis of the shaft, and adapted to fit in the slots $C^3$ and $C^4$, respectively. The rib $E^2$ is too thick to enter any of the valve slots except the slot $C^4$, so that the valve and shaft must be in predetermined angular relation when coupled.

The bearing projection F terminates at its upper end in a flattened portion $F'$ with a cylindrical bearing passage $F^2$ extending through it and normally receiving the cylindrical end portion $E^3$ of the shaft E. The latter is normally held against axial movement away from the valve C by a projection $E^4$ engaging the side of the part $F'$ adjacent the valve. When the shaft E is rotated into an angular portion, into which it can move only when the valve operating mechanism is disassembled as hereinafter described, the projection $E^4$ registers with a slot $F^3$ formed in the top wall of the bearing passage $F^2$.

The shaft E can then be moved in the direction of its length away from the valve far enough to bring a flattened portion $E^5$ of the shaft into the bearing passage $F^2$. Thereafter, by rotating the shaft to bring an edge of the flattened portion in register with the slot $F^3$, the shaft may be disengaged from the bearing F and uncoupled from the valve. The shaft E carries an agitating blade $E^6$ shown as of semi-circular form, with suitable clearance between its peripheral edge and the inner wall of the can when the blade is in a horizontal position.

The valve operating means comprises a disc G parallel to, and adjacent the outer end wall $D^8$ of the member D, and received in the recess or chamber open at its outer end, which is surrounded and defined by a cylindrical portion $D^9$ of the member D, which extends axially outwardly from the peripheral edge of said wall $D^8$. The disc G has a central aperture $G'$ in which is secured a bushing or tubular part $G^2$, though the latter may be formed integral with the disc. The part $G^2$ projects away from the inner side of the disc and is formed with projections $G^4$ and $G^5$, which in the assembled condition of the apparatus, enter sockets formed in the outer end of the valve C. Freely movable in the bore of the bushing $G^2$ is a member H having a reduced threaded inner end portion $H'$, which in the assembled condition of the apparatus, is screwed into an axial socket formed in the outer end of the valve C. At its outer end, the part H has an outwardly extending rib or flange $H^2$, between which and the outer face of the disc G, a spring I acts. As shown, the spring is a piece of spring metal, having a hub portion surrounding the part H and three radially extending bent arms $I'$, the ends of which bear against the outer face of the disc G and tend to press the latter inwardly, while resiliently holding the tapered valve C in snug engagement with its seat.

Advantageously, and as shown, the disc G is formed with openings $G^6$ to receive anti-friction rollers or wheels $G^7$, the shafts of which are radial to the valve axis and are journalled in bearings carried by the disc. The rollers $G^7$ run on the end wall $D^8$.

An outwardly extending flange portion $G^8$ of the bushing $G^2$, is spaced away from the inner face of the disc G to provide a bearing groove which receives an annular member J. The latter is in effect a ratchet wheel cut away at its periphery to form teeth or shoulders $J'$, $J^2$, $J^3$, $J^4$, and $J^5$. A peripheral edge portion of the disc extending counter-clockwise, as seen in Fig. 3, from each of the shoulders $J'$, $J^3$, and $J^5$, is curved inwardly toward the valve axis, so that as the ratchet member $J'$ is rotated in the counter-clockwise direction while each such edge portion is in engagement with a pawl K mounted in the member D for movement radial to the axis of the valve chamber $D'$. The pawl K is in the form of a projection from a plunger $K'$ working in a radial guideway $D^{10}$ formed in the member D and covered by a removable plate $D^{11}$ which has its outer face flush with the end wall $D^8$. The plate $D^{11}$ is slotted for the passage of the pawl K. A spring $K^2$ acting on the outer end of plunger $K'$ tends to hold the pawl K in engagement with the ratchet wheel J.

The disc G is provided with a radial guideway for a plunger $L'$ having a projecting pawl L and urged by a spring $L^2$ inwardly to hold the pawl L against the ratchet wheel J. In the arrangement shown, the guideway for the plunger $L'$ is formed in a member M secured against the outer side of the disc G, which is slotted for the passage of the pawl L. The member M is formed with under cut grooves $M'$ in its opposite sides to slidingly receive tongue portions $N'$ of a detachable operating handle N. The latter may be detachably clamped to the disc G by means of a screw $N^2$ swivelled in the handle lever N and screwed into a threaded socket formed in a boss $G^9$ secured to and projecting from the outer side of the disc. The handle N carries a knob or a hand-grip $N^3$ at its free end, for engagement by the hand of an operator, when the disc G and valve member C attached thereto are to be oscillated.

The angular movement of the disc G in the clockwise direction, as seen in Figs. 2 and 3, is limited by the engagement of a rigid projection $G^{10}$ from the inner side of the disc G, with a rigid projection $D^{12}$ carried by the end wall $D^8$ of the member D. The extent of movement in the opposite direction permitted the disc G, depends upon the radial position of the pawl K. The latter is in the path of movement of the pawl L, and thereby limits the counter-clockwise movements of the disc G, as shown in Fig. 3, except when the pawl L is immediately back, or at the clockwise side, of the ratchet wheel shoulder J'. In the latter case, as the wheel J is turned in the counter-clockwise direction into and through the position shown in Fig. 3A, it moves the pawl K radially outward, so that the pawl L can then move between the pawl K and the disc axis, the further counter-clockwise movement of the disc G then permitted, being limited by the engagement of a rigid projection $G^{11}$ carried by the disc G, with the previously mentioned projection $D^{12}$ from the member D.

The valve discharge passage portion $C^2$ is brought into register with the valve casing discharge passage $D^5$, by the movement of the disc G and valve C which moves the projection $G^{11}$ from its position shown in Fig. 3, into the position in which it engages the projection $D^{12}$. As the projection $G^{11}$ moves clockwise from the position in which it engages the projection $D^{12}$, the valve C is closed, and all normal positions of the valve which are clockwise of the position shown in Fig. 3, are closed positions.

The clockwise movement of the disc G required to close the valve C, carries the pawl L clockwise past the pawl K, then in engagement with the portion of the disc G immediately back of the shoulder J'. The pawl L is permitted to pass the pawl K as a result of the engagement of the beveled surface $L^3$ of pawl L with beveled surface $K^3$ of pawl K, which moves the pawl L radially outward until it can pass over the pawl K. After the pawl L is thus moved past the pawl K, the spring $L^2$ forces the pawl L back into engagement with the ratchet wheel J at the clockwise side of the pawl K. As will be apparent, the valve cannot then be re-opened until the shoulders $J^4$, $J^2$, and $J^1$ have been successively engaged by the pawl L, and thereby angularly advanced in suitable counter-clockwise steps.

During each normal clockwise movement of the disc G, the pawl K acts as a retaining pawl to prevent a corresponding equal movement of the ratchet wheel J. Such retaining action of the pawl K is insured by the successive engagement of the pawl K with the shoulders $J^1$, $J^5$, and $J^3$, in the order stated. Following each closure of the valve, three clockwise movements of the disk G, each followed by a counter-clockwise movement, are sufficient to reopen the valve, if those movements are of such magnitude that the three successive counter-clockwise movements of the disc G move first the shoulder $J^5$, then the shoulder $J^3$, and finally the shoulder $J^1$ forward, or to the counter-clockwise side of the pawl K, so that the latter may prevent the disc J from moving clockwise with the following clockwise movement of the disc G. Oscillatory movements of the disc G which are not of sufficient magnitude to carry a shoulder $J^1$, $J^5$, or $J^3$ beneath the pawl K, do not contribute to the net advancement of the ratchet wheel J required for the reopening of the valve.

As shown, the distance between the shoulders $J^2$ and $J^3$ and between the shoulders $J^4$ and $J^5$, is somewhat greater than the width of the pawl K, so that each clockwise movement of the pawl L may be and as the result of friction is attended by an initial clockwise movement of the wheel J due to friction, and required to bring the corresponding shoulder $J^5$ or $J^3$ into engagement with the pawl K. A similar restricted back lash movement of the wheel J is permitted on the closing movement of the valve, since the wheel J may then turn clockwise with the disc G, until the shoulder J' engages the pawl K. Such back lash, or clockwise movements, of the disc J, increase the magnitude of the oscillatory movements of the disc G required for the step by step advancement of the wheel J which must occur after each closure of the valve, before the latter can again be moved into its open position. As a result, the required extent of each such oscillatory movement is appreciably more than 120°, insuring a desirable extent of movement at the agitator shaft E and blade $E^6$, although with the particular arrangement shown, three full stroke counter-clockwise movements of the disc G give the wheel J the complete counter-clockwise revolution required to open the valve C.

Advantageously, the agitator shaft E and blade $E^6$ are so angularly related to the disc G in the normal condition of the apparatus, that when the projection $G^{10}$ engages the projection $G^{12}$, the blade $E^6$ is in close proximity with, but not in contact with the bottom wall $A^2$ of the tank, and a slight additional clockwise movement of the shaft E is required to bring the projection $E^4$ into axial register with the shaft bearing slot $F^3$. In the normal condition of the apparatus, therefore, the agitator shaft E is always locked in place and positively prevents the removal of the valve C from the valve passage. When the part H is unscrewed, and the disc projections $G^5$ and $G^4$ withdrawn from the valve C, the latter is free to turn clockwise, as seen in Fig. 2, until the projection $E^4$ is in axial alignment with the slot $F^3$, so that the shaft E may then be moved out of its bearings by an operator whose arm is extended into the container A through its top filling opening. Advantageously, the parts are so proportioned that the alignment of the projection $E^4$ and slot $F^3$ occurs when the blade $E^6$ is in engagement with the bottom wall of the container, as this facilitates the manipulations required for the removal and replacement of the shaft E. When the shaft E is moved out of its bearings, the valve C can be moved out of the valve passage D' into the receptacle A.

In lieu of the ratchet type of mechanism shown in Figs. 1–4 for compelling a plurality of oscillatory movements of the valve and agitator between successive opening movements of the valve, I may make use of the labyrinth or serpentine passage type of mechanism illustrated in Figs. 7–10. In the construction shown in Figs. 7–9, the container and its discharge valve and agitator provisions, may be identical with those shown in Figs. 1–6. The valve casing member DA of Figs. 7–9 may be identical with the member D previously described, except for the omission of the projection $D^{12}$ and the mounting for the pawl K of the member D, and the formation in the end wall $D^8$ of the member DA of recesses $D^{13}$, $D^{16}$, $D^{17}$, and $D^{18}$. The recess $D^{13}$ is of arc shape which, as shown, extends angularly about the axis of the valve passage D' for a little less than 180°, and conveniently, though not necessarily, has its ends $D^{14}$ and $D^{15}$ radial to said axis. The recesses $D^{16}$ and $D^{18}$ are also in the form of arcs about the valve chamber axis, and communicate with the recess $D^{13}$ at its end $D^{15}$ adjacent the inner and outer edges, respectively, of the recess $D^{13}$. The recess $D^{17}$ is radial to the axis of the valve chamber $D'$ and connects the end of the recesses $D^{16}$ and $D^{18}$ remote from the recess $D^{13}$.

Mounted in the recess $D^{13}$ is a raceway member JA which is preferably removable and shown as comprising a flat body portion abutting against, and of the same length and radial width as the bottom of the recess $D^{13}$. The member JA also comprises three ribs $J^{10}$, $J^{11}$, and $J^{12}$ curved circularly about the axis of the valve chamber $D'$. The ribs $J^{10}$ and $J^{12}$ extend from the end wall of the recess $D^{15}$ into proximity to the end wall $D^{14}$, but are each separated from the latter by a short distance. The rib $J^{11}$ has one end extending to the end wall $D^{14}$, but has its opposite end separated by a short distance from the end wall $D^{15}$. As will be apparent, the walls of the recesses $D^{13}$, $D^{16}$, $D^{17}$, $D^{18}$, and the ribs $J^{10}$, $J^{11}$, and $J^{12}$, unite to form an endless passage or raceway consisting of sections comprising the curved recess $D^{18}$, a curved section at the concave side of the rib $J^{10}$, a radial section between the end wall $D^{14}$ and adjacent end of the rib $J^{10}$, a curved section between the ribs $J^{10}$ and $J^{11}$, a radial section between the end wall $D^{15}$ and adjacent end of the rib $J^{11}$, a curved section between the rib $J^{11}$ and $J^{12}$, a radial section between the end wall $D^{14}$ and adjacent end of the rib $J^{12}$, a curved section at the convex side of the rib $J^{12}$, the curved section formed by the recess $D^{16}$, and a radial portion formed by the recess $D^{17}$.

The raceway just described receives a projection $L^5$ from a member LA mounted for radial movement in a guideway member MA attached to a disc member GA. The disc member GA is generally similar to the member G of the construction first described, but differs from the latter in the omission of the projections $G^{10}$ and $G^{11}$ and in the provisions made for the mounting of the member MA. The member GA is connected to the valve member C by means shown as including parts H and I like those associated with member G. The member LA is formed with a spring chamber $L^6$ receiving a spring $L^7$ which acts between the member GA and the member LA, and constantly tends to move the latter radially outward from the axis of the valve chamber $D^1$. The mounting member MA may be attached to the member GA in any suitable manner, or may be formed integral therewith. As shown, a pin-like projection $L^{15}$ from the member GA, is axially received in, and forms a guide for the adjacent end of the spring $L^7$.

The operating handle NA of the construction shown in Figs. 7–10, may be detachably connected to the member GA by means of a screw $N^2$ and tongue and groove connections with the mounting part MA, in a manner similar to that in which the handle N is secured to the member G. The handle NA is hollow to provide a guideway for a plunger $N^{10}$. The latter has a knob $N^{11}$ at its outer end, and has its inner end in engagement with the outer end of the part LA, and is moved radially inward to move the part LA through the slot or raceway section $D^{17}$, moving the projection $L^5$ from the raceway section $D^{16}$ into the section $D^{18}$. As shown, accidental removal of the handle NA from the plunger $N^{10}$ is prevented by a pin $N^{12}$ which is secured to the plunger and works in a slot $N^{13}$ of suitable length in the handle NA.

When the apparatus is used to dispense the same definite amount of fluid at each discharge operation, the plunger $N^{10}$ will make a definite number of radial to and fro movements in discharging the entire contents of the container. The user can thus tell from the number of such movements previously made how much of the original contents of the container have been dispensed and how much of those contents are still held in the container. To facilitate such a measure of the amount of liquid dispensed, I may mount a counting train device NB of suitably simple form on the handle NA, as shown, for actuation by the pin $N^{12}$ which is then extended into the casing of the counting device NB.

Movement of the projection $L^5$ from the raceway section $D^{16}$ back into the curved raceway section at the outer side of the rib $J^{12}$, is prevented by a pawl member O connected to the member DA by a pivot pin $O'$ and normally pressed outward into the path of movement of the projection $L^5$ by a spring $O^2$. The latter yields to permit movement of the projection $L^5$ into the section $D^{16}$ from the curved section at the outer side of the rib $J^{12}$. Similarly, a pawl P connected to the member DA by a pivot pin $P'$ is held by a spring $P^2$ in position to prevent movement of the projection $L^5$ into the raceway section $D^{18}$ from the raceway section at the concave side of the rib $J^{10}$. The spring $P^2$ yields to permit movement of the projection $L^5$ into the last mentioned section from the section $D^{18}$.

In the normal contemplated use of the apparatus shown in Figs. 7–9, the valve C after being closed, may be reopened by oscillating the handle NA to move the projection $L^5$ back and forth, until the projection $L^5$ enters the raceway section at the convex side of the rib $J^{12}$, and passes from that section into the section $D^{16}$, and is moved into radial alignment with the raceway section $D^{17}$. During the valve opening movements described, the user normally leaves the plunger $N^{10}$ free, so that the spring $L^7$ will move the projection $L^5$ radially outward when the projection passes into register with the radial raceway sections at the right hand ends of the ribs $J^{10}$, and $J^{12}$ and at the left hand end of the rib $J^{11}$. After the valve has been opened, it cannot be fully closed except by the depression of the plunger $N^{10}$ to move the projection $L^5$ through the raceway section $D^{17}$ and a following clockwise movement of the lever NA which carries the projection $L^5$ through the raceway section $D^{18}$.

With the construction shown in Figs. 7–9, it is necessary to give the lever NA two full stroke movements in the clockwise direction and two full stroke movements in the counter-clockwise direction to move the projection $L^5$ from the entrance end of the raceway section at the concave side of the rib $J^{10}$ into the raceway section $D^{16}$. If the user wishes to give additional agitation to the container contents, he may readily do so by holding the plunger NA so that the spring $L^7$ can not give radial movement to the projection $L^5$ when the latter is being oscillated in any of the curved raceway sections extending between the recess end walls $D^{14}$ and $D^{15}$.

With such arrangement as is shown in Figs. 7–9, the number of complete oscillatory movements required to reopen the valve depend upon the number of concave raceway guide surface sections provided. Thus, with the member JB shown in Fig. 10, and adapted for interchangeable use with the member JA, three complete oscillatory movements of the valve operating lever are required as a result of the fact that in the part JB, there are in addition to the three ribs J$^{10}$, J$^{11}$, and J$^{12}$, two additional ribs J$^{13}$, and J$^{14}$. As will be apparent, with a member differing from the member JA merely by the omission of the rib J$^{11}$, and either one, but not both of the ribs J$^{10}$ and J$^{12}$, the valve may be reopened at the end of one complete oscillatory movement of the lever NA.

Advantageously, and as shown, the member LA is of such radial extent that the projection L$^5$ must be entered in the curved raceway section at the inner side of the rib J$^{10}$, as shown in Fig. 7, to permit of the placement of a suitably close fitting cap member over the valve casing part D when the valve lever NA is removed and the container is in its normal transportation or storage condition. This insures that following shipment, the user must give the minimum required oscillatory movements to the valve lever to move the valve into its open position.

By replacement of the ratchet wheel J shown in Figs. 1–6, by a ratchet wheel having a different arrangement of pawl engaging teeth or shoulders, it is possible to vary the number of oscillatory movements of the valve C and associated agitator E$^6$ which are required between the closure of the valve and its subsequent reopening. However, the practical necessity for making the magnitudes of the oscillatory movements of the operating lever about those provided for in Figs. 1–6, not only because those magnitudes give the desired agitator movements, but also because it is convenient, in general, to restrict the operating lever movement to an arc of something less than 180°, make the type of construction illustrated in Figs. 7–10 preferable to that shown in Figs. 1–6, in cases in which it is desirable to make provisions for varying the number of operating lever strokes required in moving the valve between its closed and open positions.

To make it possible to agitate the container contents until the latter is practically emptied, the bottom wall A$^2$ of the container may advantageously be dished with its convex side uppermost and the outlet opening A′, and valve passage D′ so disposed that the bottom of the valve outlet passage C′ will be approximately at or below the level of the lowermost portion of the upper side of the bottom wall. It is to be observed, however, that the discharge of a final small portion of the container contents as a result of a valve opening movement, without a corresponding agitation of said final small portion, is no great disadvantage, since with suitable previous agitation, that small final portion will suitably approximate the average composition of the material with which the container was initially filled.

In my said patent, provisions are set forth for sealing various separable parts of the receptacle structure against their separation except as a result of the breakage of seals, whereby in the use of the receptacle, certain unauthorized manipulations cannot be effected without detection. All of those provisions may be used with the improved constructions disclosed herein, but need not be described or illustrated herein as they form no part of the subject matter claimed herein.

In addition to such sealing provisions as are disclosed in my said patent, the apparatus disclosed herein preferably includes a means H$^4$, for sealing the member H against unauthorized separation from the member G so that the valve C cannot be turned into position for disengagement from the agitator shaft E and removal from its seat without breaking the seal H$^4$. The latter, as shown, comprises a wire passing through an aperture in a wrench engaging projection H$^3$ from the member H and through an aperture in a lug G$^{15}$ projecting from the member G, and has its ends imbedded in, and connected by a mass of sealing metal.

As the container liquid contents are withdrawn, it is necessary to permit air or other gases to enter the container, since otherwise the discharge would be prevented by atmospheric pressure acting against the discharge outlet. In my said patent, I have disclosed a special air inlet valve arrangement for the purpose, which can be tightly closed in the transportation condition of the apparatus, and opened in the dispensing condition of the apparatus to permit inflow into the receptacle through a restricted orifice. I have found, however, that in general such a special valve is not required, and that its purpose may well be served by a sheet of paper Q placed between the removal container closure B and its seat.

For many of its uses, it is desirable to provide means for the dry ice refrigeration of the container and its contents, and those means may advantageously take the form shown in Fig. 1, wherein the refrigerating provisions comprise a housing for the container comprising a dome shaped top member R, a cylindrical body portion S and a base member T. The top portion R is adapted to provide a support for a suitable quantity of dry ice. As shown, the ice may be placed upon a diaphragm or tray member U of plywood or other heat insulating material, extending horizontally across the lower portion of the space within the portion R, and detachably supported as shown, on projections R′ from the inner wall of the member R. By the use of a tray member U of insulating material of suitable thickness, the rate of dry ice gasification can be proportioned to the refrigeration requirements. As shown, the tray U is formed with finger holes U′ to facilitate its removal and replacement, and with a peripheral notch U$^2$ which by rotation of the member U about a vertical axis of the container may be moved into or out of registration with one of the projections R′. The crown and body members RS are shown as each formed with inner and outer walls of metal spaced apart, and with provisions between the walls to restrict the transfer of heat between them. Such provisions may advantageously comprise spaced apart sheets W of aluminum foil having embossed or irregular surfaces, providing a multiplicity of heat radiating surface portions inclined in different directions, so as to minimize the transfer of heat by radiation from the hotter outer to the cooler inner wall of each of the housing sections R and S. For convenience in assemblage of the foil, and to maintain the latter against displacement, the foil strips may be suitably connected to the walls of the spaces receiving them by hangers or clips W′.

To prevent the transfer of heat by conduction between the inner and outer metal walls of the housing parts R and S, those walls are preferably connected to one another at their ends by means of interposed connection parts X, of non-metallic material of relatively poor heat conductivity such as wood, Bakelite, or the like.

The housing part S is formed with a notch positioned to receive the valve casing D and its enclosing cap in the assembled condition of the apparatus, and when the cap is removed, the valve lever N or NA may be connected to the valve and the latter operated with the refrigeration housing in place. As shown, the insulating material W², which spaces the inner and outer walls of the housing body apart at the margin of the said notch, comprises an inner extension which is shaped to fit against the container adjacent the top and sides of the valve casing member D.

The base member T preferably comprises a body portion of non-metallic, poor heat conducting material, as shown, or, at least, should have such material in engagement with the lower end portions of the container A and housing body S resting on the base member. As shown, the parts are suitably positioned by means of an upwardly extending rib portion T' on the base member T, which fits snugly about the container bottom flange or base ring A³, and is snugly received within the housing part S. The base member T is shown as formed with a large central aperture T² which may be closed by a removable disc of metal TT, shaped to seat on said member at the margin of said aperture. The gasified refrigerant fills the space between the bottom wall A² of the receptacle and the base member T, and surrounded by the base ring or flange A³ of the receptacle, which, as shown, is formed with ports A⁴ for the passage of the refrigerant gas into said space from the annular space between the body of the receptacle and the surrounding portion of the housing. When the member TT is removed, the refrigerant gas can escape freely from the housing at the rate at which gas is formed by the evaporation of the dry ice. Ordinarily, however, it is not necessary to provide special openings, such as the aperture T² and ports A⁴, for the passage of the gas into the space beneath the bottom wall A² or for its escape to the atmosphere, as such passage and escape can occur freely enough through the joint spaces between the receptacle and housing and between the body portion of the housing and the base member T. The member TT is adapted to serve as a heat transfer member receiving heat by flame impingement from a gas burner, not shown, or other heating element below the member, which may be employed whenever conditions may make it necessary or desirable to heat the receptacle, as they occasionally may.

To facilitate the transportation and handling of the container with its refrigeration housing, the member T is provided with handles T³, and the member S may be detachably secured to the base member T as by means of clamping bolts T⁴, or throw latches, and the housing parts R and S may be detachably connected as by means of clamping devices S² which serve to detachably connect outwardly extending flange portions formed on the abutting ends of the housing members S and R.

With the refrigeration housing in use, the atmosphere within the space between the container A and the housing, normally consists mainly or wholly of carbon dioxide gas formed by the gasification of dry ice which, after stable conditions are reached, slowly escapes at the bottom of the housing S at the same rate at which it is formed by the gasification of the dry ice. In consequence, the gas which enters the container through the leakage space provided by the paper Q, or by a special inlet opening, if one is provided for the purpose, to replace liquid, as the latter is withdrawn from the container, consists wholly or mainly of carbon dioxide. This is of practical importance, in that it eliminates the possibility of contamination of the container contents which would exist if the gas then entering the container were ordinary atmospheric air carrying bacteria or fungicidal or other contaminating matter. Carbon dioxide is well known to have a bacteria inhibition property. For milk storage and dispensing purposes, the container will ordinarily be made of metal, but for some other uses, the container proper may well be formed of glass.

While in accordance with the provisions of the statutes, I have illustrated and described the best forms of embodiment of my invention now known to me, it will be apparent to those skilled in the art that changes may be made in the forms of the apparatus disclosed without departing from the spirit of my invention as set forth in the appended claims and that in some cases certain features of my invention may be used to advantage without a corresponding use of other features.

Having now described my invention, what I claim as new and desire to secure by Letters Patent, is:

1. A liquid dispensing receptacle having a discharge outlet, a valve controlling said outlet, an agitator within the receptacle and operating means for opening and closing said valve including provisions compelling a plurality of movements of said agitator in moving said valve from its fully closed to its open position and comprising a part removable for replacement by an analogous part to vary the number of movements of the agitator required in moving said valve from its fully closed to its open position.

2. A liquid dispensing receptacle having a discharge outlet, an oscillating valve controlling said outlet, an agitator within the receptacle and connected to said valve to share the oscillatory movements of the latter, means operative following a movement of the valve out of its open position to confine the oscillatory movements of said valve to a range laterally displaced from said open position, and a rotary member given successive rotative movements in the same direction by successive oscillatory movements of the valve in said range and adapted on a predetermined plurality of such rotative movements to render said means inoperative.

3. A liquid dispensing receptacle having a discharge outlet, an oscillating valve controlling said outlet, an agitator within the receptacle and connected to said valve to share the oscillatory movement of the latter, means including a part sharing the oscillatory movements of the valve and a stop member and operative, following a movement of the valve out of its open position, to confine the successive oscillatory movements of the valve each to a range laterally displaced from said open position, and means actuated by said oscillatory movements to render said stop inoperative after a predetermined number of such movements.

4. A liquid dispensing receptacle having a discharge outlet, an oscillating valve controlling said outlet, an agitator within the receptacle and connected to said valve to share the oscillatory movements of the latter, means adapted to confine the oscillatory movements of the valve to a range laterally displaced from the open position of the valve, a ratchet wheel adapted when turned into a particular angular position to render said means inoperative, and a pawl sharing the oscillatory movements of said valve and adapted to intermittingly turn said wheel on repeated valve movements within said range.

5. A liquid dispensing receptacle having an outlet shaped to provide a seat for a rotary valve, a rotary valve mounted in said seat, an agitator within said receptacle, and connected to said valve for agitating movement when the valve is oscillated, means external to said receptacle including a removable part providing a labyrinth channel and a part connected to said valve to share the rotative movements of the latter and including a portion extending into said channel, the latter comprising a plurality of sections through which said portion may be moved by successive to and fro angular movements of said valve through a range of movement laterally displaced from the open position of the valve, and including connecting sections through which said portion may be moved following said oscillatory movements to adjust the valve into its open position and thence back into its closed position.

6. A liquid dispensing receptacle having an outlet shaped to provide a seat for a rotary valve, a rotary valve mounted in said seat, an agitator within said receptacle, and connected to said valve for agitating movement when the valve is oscillated, means external to said receptacle including a removable part providing a labyrinth channel, and a part connected to said valve to share the rotative movements of the latter and including a portion extending into said channel, said channel comprising a plurality of sections formed in said removable part, through which said portion may be moved by successive to and fro angular movements of said valve through a range of movement laterally displaced from the open position of the valve, said channel also including other sections formed external of said removable part through which said portion may be moved following said oscillatory movements to adjust the valve into its open position and thence back into its closed position, said other sections comprising an inner circumferential section and an outer circumferential section separated by a radial distance equal to the required aggregate radial extent of a plurality of pairs of the first mentioned sections.

7. A liquid dispensing receptacle having a discharge outlet, a valve controlling said outlet, an agitator within the receptacle, operating mechanism external to the receptacle for opening and closing said valve including provisions compelling a plurality of movements of said agitator in moving said valve from its fully closed to its open position, and a mechanism cover member adapted to be detachably connected to said receptacle when said mechanism is in a condition assumed by it in the early portion of said plurality of movements, and prevented by said mechanism from being so attached when said mechanism is in the condition assumed by it in a later portion of said plurality of movements.

8. A liquid dispensing receptacle having a discharge outlet, a rotary valve controlling said outlet, an agitator within the receptacle operating mechanism external to the receptacle for opening and closing said valve including provisions compelling a plurality of movements of said agitator in moving said valve from its fully closed to its open position, and including a member progressively advanced radially away from the axis of said valve by said movements and given a return radial movement toward the valve when the latter is opened, and a mechanism cover member adapted to be detachably connected to said receptacle when the first mentioned member is in the radial position occupied by it in the early portion of said plurality of movements and prevented by the first mentioned member from being so attached to said receptacle when in the position occupied by it in a later portion of said plurality of movements.

9. A liquid dispensing receptacle having a discharge outlet providing a seat for a conical rotary discharge valve having its smaller end at the outer side of said receptacle, means connected to the outlet end of said valve to hold the latter in its seat, an agitator shaft within said receptacle, said valve and shaft having cooperating provisions for their connection and disconnection by axial movement of the shaft toward and away from the valve and maintaining said valve and shaft, when connected, in predetermined relative angular positions, a bearing for the end of said shaft remote from the valve adapted to prevent or permit displacement of said shaft from said bearing accordingly as said shaft is in or out of a predetermined angular position, and valve operating means external to the receptacle and adapted to be detachably connected to said valve to operate the latter and holding it in place in its seat and including provisions preventing movement of the valve into said predetermined position while connected to said valve.

10. A liquid dispensing receptacle having a discharge outlet, an oscillating valve controlling said outlet, an agitator within the receptacle and connected to said valve to share the oscillatory movements of the latter, means adapted to confine the oscillatory movements of the valve to a range laterally displaced from the open position of the valve comprising a part sharing the oscillatory movements of the valve, and a stop member not sharing said movements and adapted to occupy the position in which it is engaged by said part and thereby arrests the movement of the valve in one direction, and a member intermittently advanced by repeated oscillatory movements of the valve into a position in which it prevents valve arresting engagement of said part and member.

11. A liquid dispensing receptacle having a discharge outlet, an oscillating valve controlling said outlet, an agitator within the receptacle and connected to said valve to share the oscillatory movements of the latter, means operative, following a movement of the valve out of its open position to confine the oscillatory movements of the valve to a range laterally displaced from said open position until a plurality of such oscillatory movements have been made, a ratchet wheel coaxial with, and angularly movable independently of the valve and adapted after a predetermined angular movement in one direction, to render said means inoperative, a pawl sharing the oscillatory movements of said valve and engaging said ratchet wheel and giving it an angular movement less than the first mentioned movement on each movement of the valve through said range in one direction, and a retaining pawl cooperating with said ratchet wheel to limit movement of the latter with the valve in the opposite direction.

12. A liquid dispensing receptacle having a discharge outlet, an oscillating valve controlling said outlet, an agitator within the receptacle and connected to said valve to share the oscillatory movements of the latter, means operative, following a movement of the valve out of its open position, to confine the oscillatory movements of the valve to a range laterally displaced from said open position until a plurality of such oscillatory movements have been made, a ratchet wheel coaxial with, and angularly movable independently of the valve and adapted after a predetermined angular movement in one direction, to render said means inoperative, a pawl sharing the oscillatory movements of said valve and engaging said ratchet wheel and giving it an angular movement less than the first mentioned movement on each movement of the valve through said range in one direction, and a retaining pawl permitting the ratchet wheel to share a portion only of the return movement of the valve member in the opposite direction.

13. A liquid dispensing receptacle having a discharge outlet, an oscillating valve controlling said outlet, an agitator within the receptacle and connected to said valve to share the oscillatory movements of the latter, means operative, following a movement of the valve out of its open position, to confine the oscillatory movements of the valve to a range laterally displaced from said open position until a plurality of such oscillatory movements have been made, said means comprising an actuating pawl which does, and an actuating pawl which does not share the oscillatory movements of the valve, and a ratchet wheel coaxial with, and angularly movable independently of the valve and having teeth engaged by each of said pawls, one of said teeth being radially extended to carry the retaining pawl out of the path of movement of the actuating pawl when the latter is in operative engagement with said tooth.

14. A liquid dispensing receptacle having a discharge outlet providing a conical valve seat with its smaller end at the outer side of said receptacle and having an outer surface surrounding and transverse to the axis of said seat, a conical discharge valve rotatably mounted in said seat, an agitator shaft within said receptacle and connected to said valve to share the rotative movements of the latter, a valve operating member engaging said surface, and a resilient detachable connection between said valve operating member and the valve for holding the valve in its seat.

15. A liquid dispensing receptacle having a discharge outlet providing a conical valve seat with its smaller end at the outer side of said receptacle and having an outer surface surrounding and transverse to the axis of said seat, a conical rotary discharge valve rotatably mounted in said seat, an agitator shaft within said receptacle and connected to said valve to share the rotative movements of the latter, a valve operating member, rolling elements mounted in said member to turn about axes radial to said axis and engaging said surface, and a resilient detachable connection between said valve operating member and the valve for holding the valve in its seat.

16. A liquid dispensing receptacle having a discharge outlet providing a seat for a conical rotary discharge valve having its smaller end at the outer side of said receptacle, means connected to the outlet end of said valve to hold the latter in its seat, an agitator shaft within said receptacle, said valve and shaft having cooperating provisions for their connection and disconnection by axial movement of the shaft toward and away from the valve and maintaining said valve and shaft, when connected, in predetermined relative angular positions, a bearing for the end of said shaft remote from the valve adapted to prevent or permit displacement of said shaft from said bearing accordingly as said shaft is in or out of a predetermined angular position, and means providing a seal preventing movement of said valve into said predetermined position so long as said seal is unbroken.

JESSE P. HUBBELL.